3,809,723
STABILIZATION OF POLYOXYALKYLENE
POLYETHERS
Hsien Ying Niu, Southgate, and Eugene A. Weipert, Allen
Park, Mich., assignors to BASF Wyandotte Corporation, Wyandotte, Mich.
No Drawing. Filed June 3, 1971, Ser. No. 149,776
Int. Cl. C07c 41/12
U.S. Cl. 260—611.5                                  2 Claims

ABSTRACT OF THE DISCLOSURE

Nonionic surfactants are prepared by oxyalkylating an initiator in the presence of an alkaline catalyst which must then be removed or chemically inactivated in order to prevent deterioration of the nonionic surfactant as evidenced by the development of color. It has unexpectedly been found that the alkaline degradation may be prevented by diluting the catalyst with from about 5 to about 50 times its weight of water.

BACKGROUND

1. Field of the invention

This invention relates to stabilization of nonionic surfactants by inactivation of the oxyalkylation catalyst remaining in the polyoxyalkylene polyether.

2. Description of the prior art

It is known in the preparation of polyoxyalkylene polyethers for use as nonionic surfactant that the residual alkaline catalyst utilized in the oxyalkylation step must be removed or inactivated if a stabilized nonionic surfactant is to be obtained. These processes leave much to be desired in the way of simplicity and economy. For instance, U.S. Pat. 3,341,599 teaches that in finishing polyhydric polyoxyalkylene ethers, the alkaline catalyst is removed in a step-wise process. First a mineral acid is added to the polyether to neutralize substantially all of the alkaline catalyst. Second, water is removed until a residual amount of water content of about 0.5 to about 3% of the total weight of the reaction mixture is formed. Third, the mineral acid salt is crystallized out. Finally, the last of the water is removed by partial vacuum.

British Pat. 857,534 discloses neutralizing the catalyst by treating the polyether product with an ion exchange resin.

Finally, U.S. Pat. 3,365,402 teaches that the harmful effects of an alkaline catalyst are avoided by neutralizing the catalyst with an equivalent amount of an acid having the general formula R—O—($C_mH_{2m}O$)$_x$R'—COOH in which R represents a hydrocarbon residue having from 8 to 20 carbon atoms, R' is an alkylene residue having from 1 to 3 carbon atoms, m is an integer from 2 to 4 and x is a number from 1 to 50. In each case, extraneous materials are introduced into the polyoxyalkylene polyether nonionic surfactant and involved considerable time and expense in a neutralizing process.

It is, therefore, an object of this invention to provide a simple and inexpensive process for the neutralization of the residual alkaline catalyst. This object and other objects of the invention will be readily apparent to those of ordinary skill in the art upon reading the following specification and examples.

SUMMARY OF THE INVENTION

In accordance with this invention, there is provided a process for stabilizing polyoxyalkylene polyether nonionic surfactants containing residual alkaline catalyst comprising adding to said polyether an amount of water which is from about 5 to about 50 times the weight of said catalyst contained in said polyether.

DESCRIPTION OF THE PREFERRED EMBODIMENT

It is well known to prepare nonionic surfactants by oxyalkylating an initiator in the presence of an alkaline catalyst which is typically present in an amount of about 0.1 to about 0.2% of the total reaction charge at elevated temperatures and pressures, e.g. 100° to 200° C. and about 25 to 100 p.s.i. Typically the alkaline catalyst is an alkali hydroxide, e.g. sodium hydroxide or potassium hydroxide. For the sake of brevity, incorporated herein by reference are U.S. Pats. 2,677,700, 3,101,374 and 3,504,041 and Canadian Pat. 698,560 which describe in detail the preparation of typical polyoxyalkylene polyether nonionic surfactants. It is to be recognized, of course, that further recitation of patents, text books, scientific journals and the like would be merely redundant with regards to the preparation of these surfactants.

To the polyoxyalkylene polyether is added potable, distilled, deionized, boiler or similar grade of water in an amount from about 5 to about 50 times the weight of the alkaline catalyst residue and preferably from about 15 to about 35 times the weight of the catalyst. It is only necessary that the water be added after the completion of the preparation of a polyoxyalkylene polyether although the greatest benefits of this invention are obtained by addition of the water as soon as the polyoxyalkylene polyether has reached substantially normal room conditions with respect to temperature, pressure and the like. The benefits of this invention are maximized by uniformly dispersing the water through the polyoxyalkylene polyether. Since the water is compatible with the polyoxyalkylene ether and with the intended uses of the polyether, it is not necessary to remove the water.

To date, it has been found that the simplicity of this invention has not been matched with an equally simple explanation of the unusual result, but rather with only complex hypothesis. Therefore, no explanation of the invention will be attempted at this time.

The following examples are included to illustrate the preparation of the compositions of the present invention in the process of the invention but are not to be considered limiting. Unless otherwise specified, all parts are by weight and all temperatures are expressed in degrees centigrade.

EXAMPLE I

A substituted amine initiator was prepared by reacting 1270 parts of an olefin oxide with 152.5 parts of diethanol amine at a temperature of about 125° to about 135° C. for 4 hours. The olefifin oxide was a mixture of olefin oxides containing from 15 to 18 carbon atoms. The thus prepared initiator was cooled to about 50° C. and 2.5 parts of potassium hydroxide charged to the reactor after which the temperature was raised to about 130° C. and 1210 parts of ethylene oxide was added at the rate of about 300 parts per hour. The resulting polyoxyalkylene polyether nonionic surfactant was cooled to room temperature and discharged from the reactor.

Six aliquot portions of the surfactant prepared in this example were tested for alkaline catalyst stability as follows:

Samples 1 and 2 were retained as controls, samples 3 and 4 were stabilized with the addition of 2% by weight of deionized water based on the sample weight (this being 20 times the weight of potassium hydroxide present) and samples 5 and 6 were stabilized by the addition of 3% by weight of water of the sample (this being equivalent to 30 times the amount of potassium hydroxide present). Samples 1, 3 and 5 were stored at 50° C. and samples 2, 4 and 6 were stored at room temperature. After two days of storage, sample 1 had darkened in color while samples 2 through 6 remained unchanged. After a total of 17 days storage, samples 4 and 6 showed no change of color, sample 2 was slightly darkened in comparison with sample 1 and samples 3 and 5 were slightly darkened compared with samples 4 and 6 but were much lighter than samples 1 and 2. After six months of storage under test conditions, the same relationships still prevailed.

EXAMPLE II

Using the general procedure of Example I, a similar surfactant was prepared except that the olefin oxide contained esentially only 14 carbon atoms. Again, six equal samples were tested for storage stability with samples 1 and 2 being controls, samples 3 and 4 containing 2% additional deionized water while samples 5 and 6 contained 3% additional deionized water. The samples were inspected after 4 days and sample 1 was found to have darkened while the surface layers of samples 3 and 5 were slightly darkened due to looseness of the container cap. Samples 2, 4 and 6 showed no change of color. After 7 days, sample 1 remained darkened and samples 3 and 5 were slightly dark. At this time, sample 2 had darkened while samples 4 and 6 showed no change of color. At the end of three weeks' storage time, the samples remained in the same condition as at the end of one week's storage time. After over six month's, samples 4 and 6 remained much light than sample 2 and samples 3 and 5 remained much lighter than sample 1.

EXAMPLE III

In this example the surfactant examined is a trimethylol propane initiated polypropylene oxide polymer having a molecular weight of about 2,250 which was further oxyalkylated with ethylene oxide units in an amount of approximately 25% by weight of the original propylene oxide polyol. Five equal samples are tested for storage stability, sample 1 being a control, sample 2 containing 1% by weight added deionized water, sample 3 containing 3% water, sample 4 containing 5% water and sample 5 containing 0.5% water. After one week of storage at room temperature, the five treated samples are about the same shade whereas the untreated sample 1 has darkened considerably. The samples are then stored in an oven at 50° C., the samples are inspected after 34 days aging at 50° C. and samples 1, 2 and 5 appear much darker than samples 3 and 4. Samples 3 and 4 appear to be about the same. The samples are returned to the oven and again inspected after a total of 38 days heat aging. Again samples 1, 2 and 5 have about the same shade, they are much darker than samples 3 and 4 which are essentially colorless indicating that samples 3 and 4 are substantially unaffected by the presence of free alkali whereas samples 1, 2 and 5 evidence decomposition in reverse ratio to water present.

EXAMPLE IV

In this example the surfactant is examined which has a heteric structure and is composed of about 20% long-chained alcohol which is a mixture of alcohols containing 12 to 15 carbon atoms, about 60% ethylene oxide and about 20% propylene oxide (all percents by weight) and in which the oxyalkylation catalyst is potassium hydroxide. Six equal samples are placed in clean stopper test tubes, sample 1 containing 0.5% additional water, sample 2 containing 1% water, sample 3 containing 2% water, sample 4 containing 3% water, sample 5 containing 5% water and sample 6 being the untreated control with no additional water. After 9 days storage at room temperature, no difference is observed, all samples appearing to be about the same color. The samples are then stored at 45° C. for further observation and after 12 days storage at the elevated temperature they appear to be about the same. After 19 days storage at elevated temperature there is only a slight change in samples 1, 6 and 2 which appear slight darker. After 23 days of elevated temperature storage samples 1, 2 and 6 are about the same shade. Samples 3, 4 and 5 are the lightest color and the differences between them are slight.

EXAMPLE V

In this example the surfactant examined is prepared with a triethylene tetramine initiator, two moles of a long chain alcohol with the remaining 4 active hydrogens of the amine being oxypropylated. The starting nucleus is then oxypropylated until a molecular weight of approximately 13,500 is obtained. Again six equal samples are tested for storage stability with sample 1 containing 0.5% by weight additional water, sample 2 containing 1% water, sample 3 containing 2% water, sample 4 containing 3% water, sample 5 containing 5% water and sample 6 being a control with no additional water. Sample 2 is somewhat cloudy and samples, 3, 4, and 5 are very cloudy since water is insoluble in the surfactant. The samples are left at 40° C. for aging. After 12 days storage, sample 6 is darker than sample 1 while samples 2 through 5 remain cloudy but light in color. After 19 days storage sample 6 is significantly darker than sample 1, sample 2 is slightly cloudy and samples 3 through 5 are cloudy without apparent change of color. After 23 days storage, sample 6, control is dark (brown), sample 1 is almost colorless and samples 3 through 5 are cloudy and colorless while sample 2 remains slightly cloudy.

EXAMPLE VI

In this example the surfactant under study is based on an initiator containing triethylamine tetramine and 4 moles of a long chain alcohol which is a mixture of alcohols containing 15 to 18 carbon atoms which is thereafter oxyalkylated with a mixture of propylene oxide and ethylene oxide to the desired molecular weight. Again six equal samples were tested for storage stability, sample 1 containing 0.5% by weight additional water, sample 2 containing 1% water, sample 3 containing 2% water, sample 4 containing 3% water, sample 5 containing 5% water and sample 6 being the untreated control. The samples are stored at 50° C. for observation. After 12 days storage at the elevated temperature sample 6 appears significantly darker than the treated samples. After 19 days storage at elevated temperature sample 6 is much darker ((Gardner color about 6) while samples 1 through 5 are about the same with sample 1 being slightly darker. After a total of 23 days storage at the elevated temperature sample 6 is dark drown while samples 1 through 5 are about the same showing little change from the original color.

The examples and methods described in the foregoing specification are for the purpose of illustration and not limitation. Many other modifications and ramifications will naturally suggest themselves to those skilled in the art based on this disclosure. These are intended to be comprehended as within the scope of this invention.

Having thus described my invention, what is desired to claim and secure by Letter Patent is:

1. A color stabilized nonionic surfactant polyoxyalkylene polyether composition prepared by adding water to a nonionic surfactant polyoxyalkylene polyether containing an alkali hydroxide catalyst in the amount of about 0.1 to about 0.2 percent by weight of said polyether; said water being (a) in the amount of between about 1.5 and 7 weight percent of said polyether and (b) selected from the group consisting of distilled water, deionized water, potable water or boiler grade water.

2. The composition according to claim 1 wherein the water is deionized water.

References Cited
UNITED STATES PATENTS

| | | | |
|---|---|---|---|
| 3,356,738 | 12/1967 | Hauser et al. | 260—615 B |
| 3,370,056 | 2/1968 | Yotsuzuka et al. | 260—615 BX |
| 2,870,220 | 1/1959 | Carter | 260—611.5 UX |

FOREIGN PATENTS

| | | | |
|---|---|---|---|
| 651,701 | 11/1962 | Canada | 260—611.5 |

BERNARD HELFIN, Primary Examiner